(12) United States Patent
Sollenberger et al.

(10) Patent No.: US 7,899,956 B2
(45) Date of Patent: Mar. 1, 2011

(54) SYSTEM AND METHOD OF REDUCING THE RATE OF INTERRUPTS GENERATED BY A DEVICE IN MICROPROCESSOR BASED SYSTEMS

(75) Inventors: Nelson Sollenberger, Farmingdale, NJ (US); Yan Zhang, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1559 days.

(21) Appl. No.: 11/010,992

(22) Filed: Dec. 13, 2004

(65) Prior Publication Data

US 2006/0080470 A1 Apr. 13, 2006

Related U.S. Application Data

(60) Provisional application No. 60/616,957, filed on Oct. 7, 2004.

(51) Int. Cl.
*G06F 3/00* (2006.01)
*G06F 13/24* (2006.01)
*G06F 9/00* (2006.01)

(52) U.S. Cl. ............ 710/48; 710/47; 710/260; 712/233; 713/500; 713/502; 718/102

(58) Field of Classification Search ...................... 710/48
See application file for complete search history.

(56) References Cited

U.S. PATENT DOCUMENTS

| | | | |
|---|---|---|---|
| 4,949,333 A * | 8/1990 | Gulick et al. ................ | 370/282 |
| 5,140,679 A * | 8/1992 | Michael ........................ | 710/106 |
| 5,278,956 A * | 1/1994 | Thomsen et al. ............. | 711/167 |
| 5,301,275 A * | 4/1994 | Vanbuskirk et al. ............. | 710/48 |
| 5,561,826 A * | 10/1996 | Davies et al. .................... | 710/71 |
| 5,604,870 A * | 2/1997 | Moss et al. ...................... | 710/100 |
| 5,717,870 A * | 2/1998 | Dobson ........................... | 709/250 |
| 5,805,909 A * | 9/1998 | Diewald ......................... | 713/322 |
| 6,065,089 A * | 5/2000 | Hickerson et al. .............. | 710/266 |
| 6,219,797 B1 * | 4/2001 | Liu et al. ......................... | 713/500 |
| 6,615,305 B1 * | 9/2003 | Olesen et al. ................... | 710/262 |
| 7,802,030 B2 * | 9/2010 | Otsuji .............................. | 710/48 |
| 2003/0149814 A1 * | 8/2003 | Burns et al. ..................... | 710/52 |
| 2003/0171114 A1 * | 9/2003 | Hastings ..................... | 455/426.2 |
| 2004/0059531 A1 * | 3/2004 | Tomida et al. .................. | 702/79 |
| 2004/0123008 A1 * | 6/2004 | Connor et al. ................. | 710/260 |

* cited by examiner

*Primary Examiner* — Henry W Tsai
*Assistant Examiner* — Michael Sun
(74) *Attorney, Agent, or Firm* — McAndrews, Held & Malloy, Ltd.

(57) ABSTRACT

Herein described are at least a system and a method of reducing or decreasing the rate of interrupts transmitted by a device to a microprocessor. In a representative embodiment, the device comprises a universal asynchronous receiver/transmitter. In a representative embodiment, the rate of interrupts is reduced by receiving and using a first signal as an input to a first counter. The first counter outputs a first count, and compares the first count to a value provided by a memory. Subsequently, a second signal is generated to initiate an interrupt when the first count equals the value. In a representative embodiment, a system for delaying transmission of an interrupt from a universal asynchronous receiver/transmitter (UART) to a microprocessor comprises a counter capable of generating a count, a memory capable of storing a value, and a comparator used for comparing the count to the value.

30 Claims, 4 Drawing Sheets

SYSTEM AND METHOD OF REDUCING THE RATE OF INTERRUPTS GENERATED BY A DEVICE IN MICROPROCESSOR BASED SYSTEMS

CROSS-REFERENCE TO RELATED APPLICATIONS/INCORPORATION BY REFERENCE

This application makes reference to and claims priority from U.S. Provisional Patent Application Ser. No. 60/616,957 entitled "System and Method of Reducing the Rate of Time Out Interrupts Generated by a UART in Microprocessor Based Systems" filed on Oct. 7, 2004, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In one or more instances, the rate of interrupts transmitted to a microprocessor by a device, such as a universal asynchronous receiver/transmitter (UART) may be excessive. When the frequency of interrupts is excessive, valuable microprocessor resources may be used unnecessarily by the UART. As a consequence, these resources may be unavailable for use by other applications, resulting in one or more performance issues.

The limitations and disadvantages of conventional and traditional approaches will become apparent to one of skill in the art, through comparison of such systems with some aspects of the present invention as set forth in the remainder of the present application with reference to the drawings.

SUMMARY OF THE INVENTION

Various aspects of the invention provide a plurality of systems and methods of reducing or decreasing the rate of interrupts provided to a microprocessor.

In a representative embodiment, a method of reducing the rate of interrupts from a universal asynchronous receiver/transmitter (UART) comprises receiving a first signal from the UART, using the first signal as an input to a first counter wherein the first counter outputs a first count, comparing the first count to a value, and generating a second signal used to initiate the interrupt when the first count equals the value.

Yet, in another representative embodiment, a method of reducing the frequency of one or more interrupts transmitted by a device comprises first receiving one or more first signals that indicate when one or more conditions are satisfied, second receiving a second signal used as a clock pulse, using the one or more first signals and said second signal as inputs to a counter, wherein the counter outputs a count, comparing the count to a value, and generating the one or more interrupts when the count equals the value.

In a representative embodiment, a system for reducing the rate of interrupts transmitted by a device to a microprocessor comprises a first counter capable of generating a first count, a memory capable of storing one or more values, and a comparator used for comparing the first count to the value. The comparator generates a second signal, wherein the second signal is used to initiate the interrupt when the first count equals the value.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention provide a plurality of systems and methods of reducing the rate of interrupts transmitted by a device to a microprocessor. In a representative embodiment, the device may comprise a universal asynchronous receiver/transmitter (UART) or UART similar device.

Various aspects of the invention adapt the use of one or more counters and supporting circuitry to extend the time out duration of a UART. In a representative embodiment, the time out duration is extended to that specified by a value stored in a programmable memory. In a representative embodiment, the UART, in which the interrupt rate is decreased, comprises a National Semiconductor NS16450/NS16550 or similar UART integrated circuit chip. Typically, the UART comprises an internal counter that may be used to count the elapsed time between interrupts. The elapsed time may be measured in terms of one or more character periods. The one or more character periods may be generated by a suitable clocking signal. The clocking signal may be fed into the clock input of the internal counter. When one or more conditions, often described as "one or more time out conditions", are satisfied, the counter may begin incrementing its count. In a representative embodiment, a signal may trigger the interrupt encoding logic to generate a time out interrupt when the counter reaches its predefined count. In a NS16450/16550 compatible UART device, the predefined value is four and the rate of time out interrupts may not be adjusted. In a representative embodiment, a time out interrupt occurs when certain time out conditions are met. For example, the one or more time out conditions may be met if three operational conditions are satisfied. Satisfying the first operational condition may comprise that there is no read operation being performed on the receiver FIFO of the UART during the time out period. The second operational condition may be satisfied if data is not being received by the receiver FIFO of the UART during the time out period. Finally, the third operational condition may be satisfied if there is at least one character in the receiver FIFO of the UART. If any of the three conditions are not satisfied, the counter will be reset, and no time out interrupt will be generated. If all three of these conditions are met when a particular count is reached (such as the fourth character period count), a signal, termed a counter reaching signal (CRS), for example, may be used to trigger a time out interrupt. The interrupt is also used to reset the UART counter.

Figure 1A:
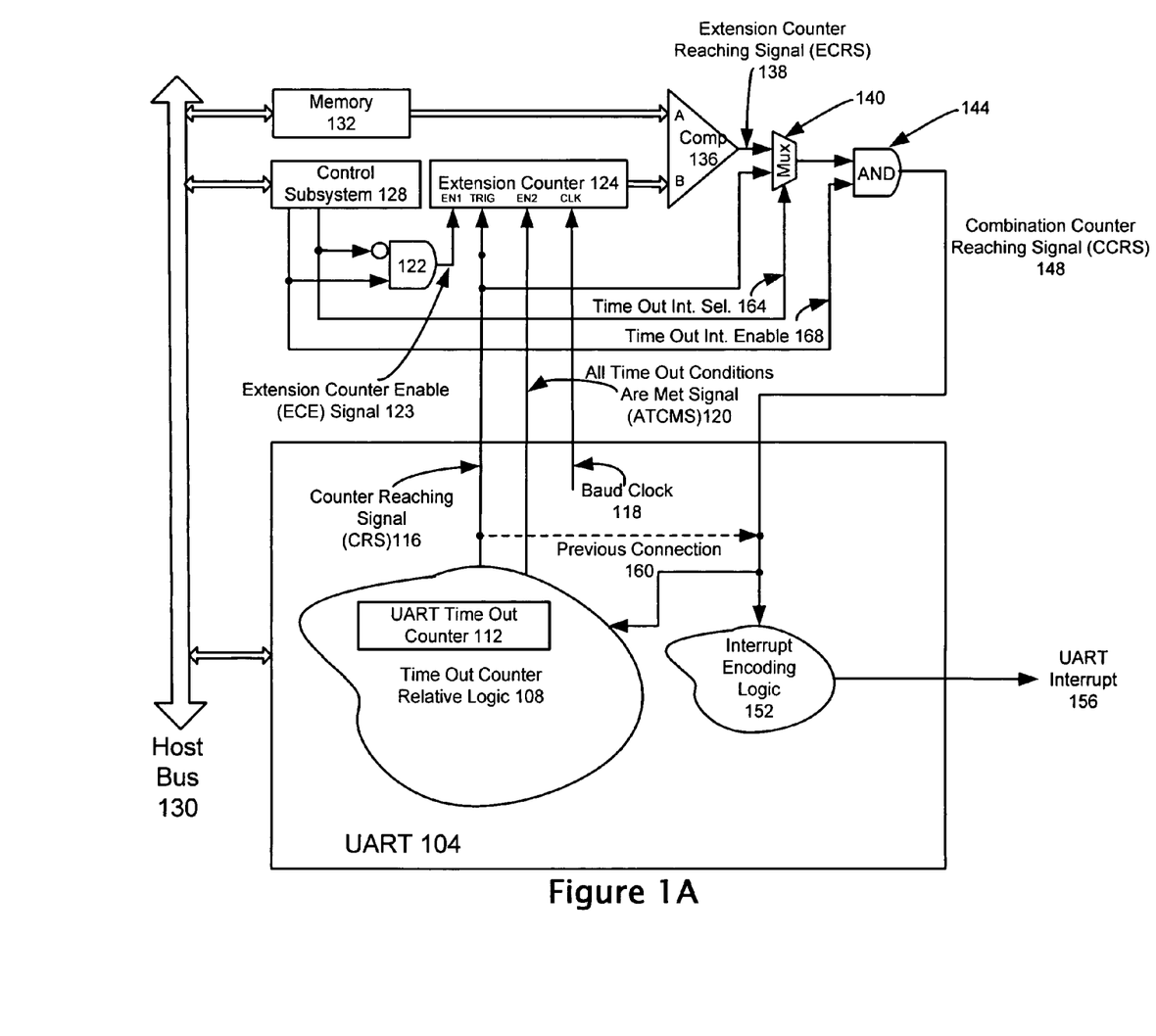
FIG. 1A is a block diagram of a UART interrupt rate reducing system in accordance with an embodiment of the invention.

FIG. 1A is a block diagram of a system that may be used to reduce the rate or frequency of interrupts generated by a UART 104, in accordance with an embodiment of the invention. The system may be referred to as a UART interrupt rate reducing system. The UART interrupt rate reducing system comprises an extension counter enable logic circuitry 122, an extension counter 124, a control subsystem 128, a memory 132, a comparator 136, a multiplexer 140, and gate logic circuitry 144. In a representative embodiment, the UART interrupt rate reducing system may interface and interact with a UART 104 by way of one or more pinouts. Of course, the one or more pinouts may provide one or more internal signals to the interrupt rate reducing system. In a representative embodiment, the UART 104 may incorporate the UART interrupt rate reducing system within a single integrated circuit chip. The UART 104 itself may comprise a counter, which may be referred to as a UART time out counter 112. The UART time out counter 112 and relative logic 108 generates a Counter Reaching Signal (CRS) 116 output after four-character periods when all time out conditions are valid. The UART time out counter 112 may increment its count at every baud clock of UART 104, for example.

In the absence of the UART interrupt rate reducing system, the Counter Reaching Signal (CRS) 116 is processed by way of circuitry within the UART 104, referred to as interrupt encoding logic 152, which processes a UART interrupt signal 156 for transmission to a microprocessor. A UART 104 operating without the UART interrupt rate reducing system utilizes a direct connection (as illustrated by the previous connection 160 dotted line) into the interrupt encoding logic 152. The previous connection 160 (shown in dotted line fashion) illustrates a direct pathway of the CRS 116 to the interrupt encoding logic 152 of the UART 104, provided in a typical UART 104. In a representative embodiment, an implementation of the present invention is accomplished by way of disconnecting the CRS 116 from the interrupt encoding logic 152 and connecting the newly generated Combination Counter Reaching Signal (CCRS) 148 to the interrupt encoding logic 152.

Various aspects of the present invention comprise delaying CRS 116 before it arrives to the interrupt encoding logic 152, by way of the UART interrupt rate reducing system, such that the rate of UART interrupts 156 transmitted to the microprocessor will be reduced. When the UART interrupt rate reducing system is used, the CRS 116 is transmitted to the extension counter 124 as illustrated in FIG. 1A. CRS 116 may be supplied to the interrupt rate reducing system by way of using a corresponding pinout of a UART 104 integrated circuit chip. The UART interrupt rate reducing system may adapt the use of one or more counters that resides external to the UART or UART compatible device. The external counter, such as the extension counter 124 may comprise any digital logic circuitry. A Baud Clock 118 may be used as an input clock for the extension counter 124. Baud Clock 118 may be supplied to the interrupt rate reducing system by way of using a corresponding pinout of a UART 104 integrated circuit chip, for example, when the interrupt rate reducing system is implemented within another integrated circuit chip. Likewise, in a representative embodiment, the Baud Clock pinout may be connected to an appropriate input clock pinout associated with the extension counter 124 if the interrupt rate reducing system is implemented in a separate integrated circuit chip.

For example, the extension counter 124 may be incremented when the extension counter 124 is clocked using the Baud Clock 118 signal. The extension counter 124 may be enabled by Extension Counter Enable (ECE) signal 123 as shown, for counting to occur. In a representative embodiment, the extension counter 124 is triggered by way of the CRS 116 when an Extension Counter Enable signal (ECE) 123 and an All Time Out Conditions Are Met Signal (ATCMS) 120, is set active (or for example, set at a logical high level). In a representative embodiment, the ECE signal 123, CRS 116 and ATCMS 120 are input into enable 1 (EN1), trigger (TRIG), and enable 2 (EN2) inputs of a counter, respectively. When either ECE signal 123 or ATCMS 120 is not in their active states, the extension counter may be reset. When the extension counter 124 is reset, it cannot increment. The extension counter 124 may comprise a synchronous type of counter. In a representative embodiment, the inputs EN1 and/or EN2 may be negatively enabled such that each of the ATCMS 120 or ECE signal 123 must be set to an inactive state (e.g., logical low level) for the counter to reset. To engage the UART interrupt rate reducing system with the UART 104, the ECE signal 123 must be set to its active state by properly setting a Time Out Interrupt Select signal 164 and a Time Out Interrupt Enable signal 168. The ATCMS 120 may be set to its active state if one or more operational conditions of the UART 104 are satisfied. In a representative embodiment, three operational conditions must be satisfied. For example, satisfying a first operational condition may require that there is no read operation being performed on the receiver FIFO of the UART during the time out period. A second operational condition may be satisfied if data is not being received by the receiver FIFO of the UART during the time out period. Finally, a third operational condition may be satisfied if there is at least one character within the receiver FIFO of the UART. The ATCMS 120 is generated by the time out counter 112 and relative logic 108 of the UART 104. The relative logic 108 may comprise any digital logic circuitry that utilizes one or more logical levels associated with the one or more operational conditions. The count generated by the extension counter 124 may be compared to a programmable value provided by the memory 132. The memory 132 may comprise a register, for example. In a representative embodiment, execution of software or microprocessor code may program the value into the memory 132. In a representative embodiment, the value may comprise any value, such as the value 4, for example. In this representative embodiment, when the value equals 4, its UART interrupt rate is reduced to one quarter of its previous rate. The programmable value may be stored into the memory 132 by way of a host bus 130, as shown. The host bus 130 may also provide a transmission path for the control subsystem 128 and the UART 104, as illustrated. The programmable value may be compared with the count provided by the extension counter 124 by way of using the comparator 136. The comparator 136 may output an active signal (e.g., logical high signal) when its input terminals, A and B, receive equivalent signals, as provided by the memory 132 and the extension counter 124, respectively. Similar to that of the CRS 116, the comparator 136 outputs an Extension Counter Reaching Signal (ECRS) 138 which signifies that the extension counter 124 has reached the programmable value stored in memory 132. The control subsystem 128 may provide one or more control signals such as the Time Out Interrupt Select signal 164 and/or the Time Out Interrupt Enable signal 168 that enable(s) or disable(s) transmission of the output of the comparator 136. The output of the comparator 136 may be input into one of two inputs of a two input multiplexer 140. The other input of the two input multiplexer 140 may comprise the Counter Reaching Signal (CRS) 116. Either the output of the comparator 136 or the CRS 116 may be selected by using a Time Out Interrupt Select signal 164. When the UART interrupt rate reducing system is used, the output of the comparator 136 is transmitted by the multiplexer 140. Otherwise, the reduced rate functionality provided by the UART interrupt rate reducing system is bypassed, in which case, the CRS 116 is output by the multiplexer 140. The Interrupt Select signal 164 is used to determine whether the reduced rate functionality is applied to the CRS 116. The Time Out Interrupt Enable signal 168, as shown in FIG. 1A, may be used to enable the transmission of the multiplexer 140 output to the interrupt encoding logic 152, by way of the AND gate 144. The AND gate 144 outputs a Combination Counter Reaching Signal (CCRS) 148 that is transmitted back to the UART's interrupt encoding logic 152 as a input pin. The UART's interrupt encoding logic 152 may process the CCRS 148 such that an appropriate UART interrupt signal 156 is generated for the microprocessor. In a representative embodiment, the UART interrupt signal 156 comprises a signal that has transitioned to its active state (or logical high level).

The CCRS 148 may be considered a trigger signal provided to the interrupt encoding logic 152, which is used to generate a UART interrupt 156. The CCRS 148 acts to reset the UART time out counter 112 and the extension counter 124 once the programmable value matches the count provided by the extension counter 124. For example, when the count of the extension counter 124 reaches the value 4 (an exemplary programmable value that is stored in the memory 132), CCRS 148 will transition positively, causing the UART interrupt signal to transition positively, as well. In a representative embodiment, a positive transition of the CCRS 148 will reset the UART time out counter 112 and/or its relative logic 108. The extension counter 124 is allowed to count back up again, by setting ATCMS 120 to its inactive state (e.g., logical low level) by way of the time out counter 112 and its relative logic 108. When ATCMS 120 is set to its inactive state, the extension counter 124 will reset to an initial state such as the value zero. Thereafter, whenever the All Time Out Conditions are met, ATCMS 120 will be set to its active state again. Then the extension counter 124 will start counting up from its initial state (e.g., the value zero). Accordingly, if the programmable value is 4, 8, 16, the time out interrupt rate would be reduced to one-quarter, one-eighth, one-sixteenth, etc. For example, given a 115.2 K baud rate, and assuming there are 7.5 bits per character and a time out period of 4 character periods, it would take approximately 260.4 microseconds (4*7.5/115,200) before a time out interrupt is generated. However, by utilizing the UART interrupt rate reducing system with a programming value of 4, the time out interrupt interval may be increased fourfold to a 1.042 ms time duration. When the baud rate is at 3686.4 K, a programming value of 256 may provide a 2.083 ms interval between UART interrupt times, for example. Thus, the time out interrupt rate will be adjustably decreased or reduced, relieving the microprocessor from high interrupt rates.

It is contemplated that there may be a number of different implementations of the UART interrupt rate reducing system. For example, the Counter Reaching Signal CRS 116 may be generated as a level signal or a pulsed signal. In a representative embodiment, the time out counter 112 and its relative logic 108 may generate a pulse after 4 character time periods are elapsed. The pulse will trigger the extension counter to increment by one count. In another representative embodiment, the extension counter 124 will increment at every baud clock edge when CRS is set to its active state. Therefore, one count using the external counter 124 when a level signal is utilized corresponds to one baud period of elapsed time instead of a 4 character time period as used in the pulsed case. To obtain the same interrupt rate as found when the extension counter is triggered by the pulsed signal, the extension counter 124, memory 132 and comparator 136 may be easily adjusted when the extension counter is triggered by the level signal. For example, additional bits may be utilized to implement the extension counter 124.

In a representative embodiment, implementation of this invention may utilize two time out counters. In this example, the UART interrupt rate reducing system may be incorporated within the UART as a single chip or integrated circuit, but the UART itself utilizes two counters to compute the elapsed time for generating time out interrupts. The first counter in the UART may be used to count the number of four consecutive character periods. When the first counter reaches its first count when one or more conditions (e.g., when all time out conditions are met), the first counter may trigger the second counter in UART to increment. Once the second counter reaches a count of 4, corresponding to a programmed value, it may generate the Counter Reaching Signal 116 as previously described in reference to FIG. 1A. Both counters in the UART may be reset when a time out interrupt is generated or when one or more or all time out interrupt conditions are not satisfied.

Yet in another embodiment, an interrupt rate reducing system does not use CRS 116, the UART time out counter 112, and its relative logic 108 to compute the elapsed time. Instead, the embodiment adopts the use of an extension counter to compute the elapsed time when one or more conditions are met (e.g., the all time out conditions are met). For example, an extension counter may be made to increment using a clock such as the baud clock (as referenced in FIG. 1A) and one or more signals may be used to indicate when one or more conditions are met such as when using the ATCMS 120, as shown with respect to FIG. 1A. This embodiment does not utilize the Counter Reaching signal 116 shown in FIG. 1A. The UART rate reducing system may employ the other supporting circuitry as shown in FIG. 1A. If such an implementation were used as opposed to the interrupt rate reducing system of FIG. 1A, the value (e.g., an interrupt delay factor) programmed into a memory similar that to used in FIG. 1A (e.g., memory 132) would have to be about four times the value. In addition, some necessary adjustments may be made to the extension counter 124, memory 132 and comparator 136.

Use of additional logic may be adapted to reduce power consumption of extension counter 124 and comparator 136 when the UART interrupt rate reducing system is not utilized. Extension Counter Enable logic circuitry 122 and its corresponding output signal, ECE signal, are used to enable the extension counter 124. When the Time Out Interrupt Select 164 does not select Extension Counter Reaching Signal (ECRS) or when the Time Out Interrupt Enable 168 is inactive, the Extension Counter Enable 122 is placed in an inactive state, obviating unnecessary power consumption because the operation of the extension counter 124 and comparator 136, for example, have been turned off.

In general, aspects of the present invention are not limited to utilizing a specific UART or a specific implementation of a UART design. In addition, various aspects of the UART interrupt rate reducing system are not limited to a specific implementation. The functions performed by the extension counter 124, the control subsystem 128, the memory 132, the comparator 136, the multiplexer 140, and the AND gate 144 may be implemented using one or more types of circuitries. Various logic circuitries may be used to implement the one or more components 122, 124, 128, 132, 136, 140, 144 of the UART interrupt rate reducing system. For example, the total number of bits employed in an extension counter may vary from one interrupt rate reducing system to other interrupt rate reducing system. The implementation described in FIG. 1A is only one representative embodiment of the present invention.

Figure 1B:
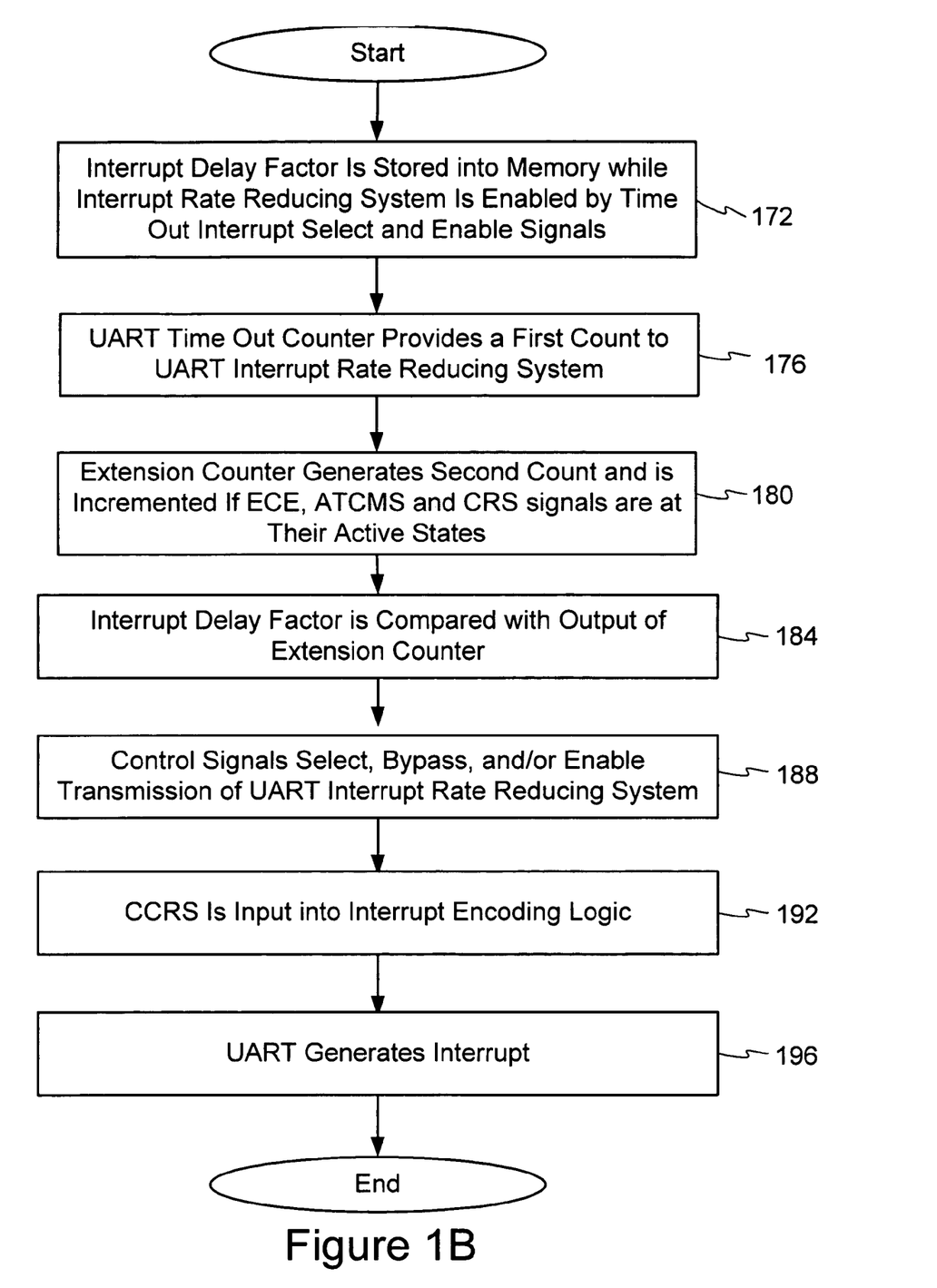
FIG. 1B is an operational flow diagram illustrating a first method of reducing the rate of transmission of interrupts from a universal asynchronous receiver/transmitter (UART) in accordance with an embodiment of the invention.

FIG. 1B is an operational flow diagram illustrating a first method of reducing the rate of transmission of interrupts from a universal asynchronous receiver/transmitter (UART) in accordance with an embodiment of the invention. At step 172, a programmable value which functions as an interrupt delay factor may be stored into memory 132 while the extension counter 124 may be enabled by way of the Time Out Interrupt Select and Time Out Interrupt Enable signals 164, 168. A user may store the interrupt delay factor into the memory 132 by way of the host bus 130. At step 176, the UART time out counter 112 provides a first count to the UART interrupt rate reducing system by way of the counter reaching signal (CRS) 116. At step 180, the extension counter 124 generates a second count by using the ECE signal 123 and ATCMS 120 as enable/clear inputs to the extension counter 124, CRS 116 as a trigger input, and the baud clock 118 as a clock input, for example. The extension counter 124 is incremented if CRS 116, ECE signal 123, and ATCMS 120 are at their active states. Next, at step 184, the interrupt delay factor is compared with the output of the extension counter 124. If the interrupt delay factor is 4, an active signal (for example, a logic high level signal) from the comparator 136 occurs when the extension counter 124 reaches its fourth count. Hence, the delay is increased approximately fourfold compared to what it was previously. The process continues with step 188, at which one or more control signals (e.g., Time Out Interrupt Select 164 and Time Out Interrupt Enable 168), generated by the control subsystem 128, may be used to select, bypass, and/or enable the transmission of the comparator 136 output, ECRS 138. For example, the CTO interrupt select signal 164 may be used to bypass processing by the comparator 136. At step 192, the CCRS 148 is input back into the interrupt encoding logic 152 implemented within the UART 104. Then at step 196, the interrupt encoding logic 152 processes the CCRS 148 to generate an interrupt signal characterized by a reduced interrupt rate.

Figure 1C:
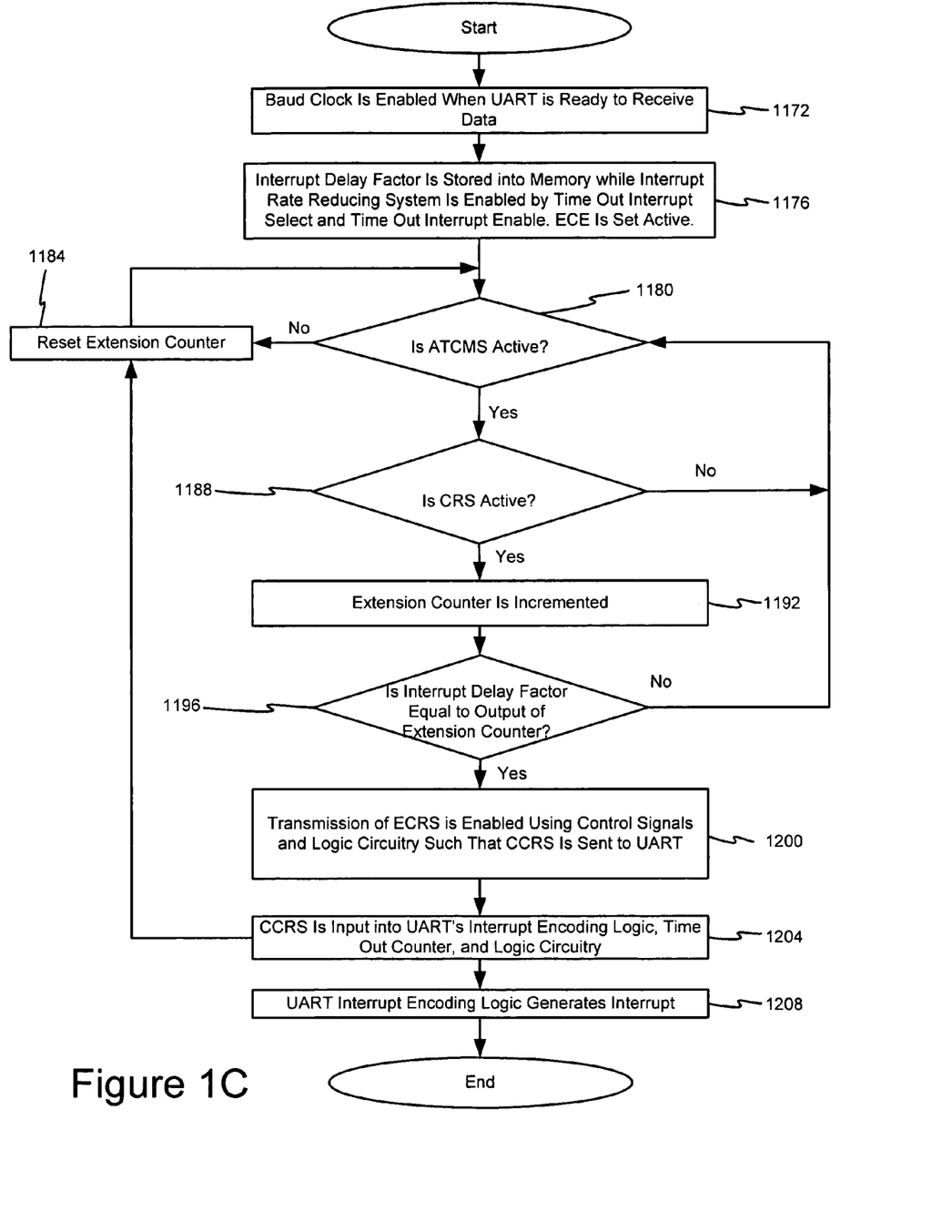
FIG. 1C is an operational flow diagram illustrating a second method of reducing the rate of transmission of interrupts from a universal asynchronous receiver/transmitter (UART) in accordance with an embodiment of the invention.

FIG. 1C is an operational flow diagram illustrating a second method of reducing the rate of transmission of interrupts from a universal asynchronous receiver/transmitter (UART) in accordance with an embodiment of the invention. At step 1172, the baud clock is enabled when the UART is ready to receive data. At step 1176, the interrupt delay factor is stored into memory while the interrupt rate reducing system is enabled by the Time Out Interrupt Select and Time Out Interrupt Enable signals. ECE is set active to enable the extension counter. At step 1180, ATCMS determines the operation of the extension counter. If ATCMS is active, the process proceeds to step 1188; otherwise, the process proceeds with step 1184. At step 1184, the extension counter is reset to its initial state. Its initial state may comprise the value zero. Next, the process reverts back to step 1180 in which the ATCMS is reevaluated. At step 1188, CRS determines the operation of the extension counter. If at step 1188, CRS is in its inactive state, the process reverts back to step 1180. Otherwise, the process continues with step 1192, at which the extension counter is incremented. The extension counter may increment, for example, at a negative transition of the CRS signal. In other instances, the extension counter may increment, for example, at a positive transition of the CRS signal. Next, at step 1196, the output of the extension counter is evaluated against the interrupt delay factor. If the values are equal, at step 1200, transmission of the ECRS is enabled using control signals (i.e., Time Out Interrupt Enable and Time Out Interrupt Select) that provide control to logic circuitry (e.g., the multiplexer and the AND gate). If, at step 1196, it is determined that the output of the extension counter is not equal to the interrupt delay factor, the process reverts back to step 1180, such that the extension counter may be further incremented if ATCMS is active. Subsequently, at step 1204, the CCRS is transmitted to the interrupt encoding logic, time out counter, and logic circuitry of the UART. CCRS may act to reset the time out counter and its relative logic of the UART. At step 1204, CCRS also subsequently triggers a reset of the extension counter. Finally, at step 1208, the UART interrupt encoding logic generates the UART interrupt.

Figure 2:
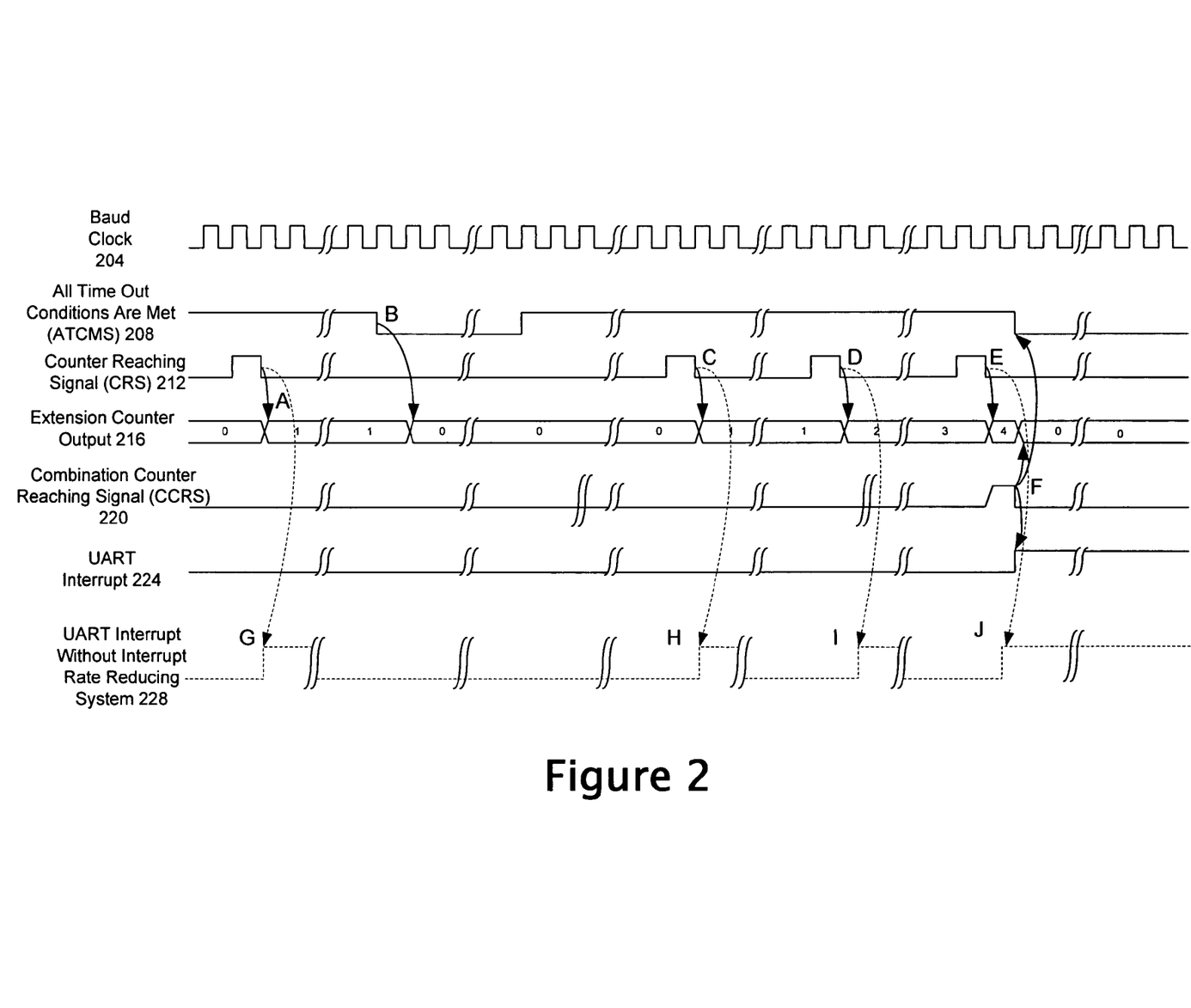
FIG. 2 illustrates one or more timing diagrams of the one or more waveforms or signals associated with the UART and the UART interrupt rate reducing system shown in FIG. 1A, in accordance with an embodiment of the invention.

FIG. 2 illustrates one or more timing diagrams 204, 208, 212, 216, 220, 224, 230 of the one or more waveforms or signals associated with the UART and the UART time out interrupt rate reducing system shown in FIG. 1A, in accordance with an embodiment of the invention. As illustrated in the baud clock timing diagram 204, the baud clock is illustrated as a periodic clock pulse. The baud clock supplies the clock for the extension counter shown in FIG. 1A. The All Time Out Conditions Are Met Signal (ATCMS), as illustrated in the ATCMS timing diagram 208, is generated by the UART time out counter and relative logic. The ATCMS is set to an active state (e.g. a logic high level in FIG. 2) when all operational conditions are satisfied. As was described in reference to FIGS. 1A and 1B, when the ATCMS is set to its active state (or level), the extension counter becomes enabled, such that it may increment its count. On the other hand, when the ATCMS is set to its inactive state (or level, e.g. a logic low level), the extension counter becomes disabled and the extension counter and the UART time out counter is reset. In the representative embodiment described in FIGS. 1A and 1B, the Counter Reaching Signal (CRS), shown in the CRS timing diagram 212 of FIG. 2, is generated by the UART time out counter and its relative logic. In accordance with the representative embodiment of FIGS. 1A and 1B, the CRS must be set active (e.g. set to a logic high level in FIG. 2) while the ATCMS is active, to facilitate counting of the extension counter. As illustrated by label A of FIG. 2, the baud clock causes the extension counter output, shown in the extension counter output timing diagram 216, to increment from 0 to 1 when the CRS and ATCMS are both in their active states. As illustrated by label B, the extension counter output resets to zero because the ATCMS has transitioned to a low level. As illustrated by labels C and D, the ATCMS and CRS signals are at an active level, allowing the extension counter output to increment when clocked by the baud clock. At label C, the extension counter output increments to the value 1, while at label D, the extension counter output increments to the value 2, etc. At label E, the extension counter output increments to the value 4, at which point, the combination counter reaching signal (CCRS), shown in the CCRS timing diagram 220, transitions to an active level (e.g. logic high level in FIG. 2). At label F, the CCRS active level signal is selected by way of control signals (e.g., Time Out Interrupt Select and Time Out Interrupt Enable) provided by the control subsystem, such that the ECRS signal is transmitted through the multiplexer and gate logic circuitry 144. At the output of the gate logic circuitry, the CCRS is generated and finally processed by the relative logic (108, FIG. 1) of the UART, to facilitate the transition of the ATCMS to a low level, thereby resetting the UART time out counter and the extension counter of the UART interrupt rate reducing system. The CCRS is processed by the interrupt encoding logic (152, FIG. 1) to facilitate an active level (e.g. a logical high level) transition of the UART interrupt, as shown in the UART interrupt timing diagram 224. In the representative embodiment of FIG. 2, the extension counter counts up to the value 4, reducing the UART time out interrupt rate to one-quarter of what it would be if the UART interrupt rate reducing system were not used. This reduction in interrupt rate may be easily seen when one compares the UART interrupt timing diagram 224 with that of the UART interrupt without rate reducing system timing diagram 228, as shown in FIG. 2. Timing diagram 228 illustrates the case in which the UART interrupt rate reducing system is not used; as a consequence, there are four times as many time out interrupts in timing diagram 228 compared with that of timing diagram 224. The UART interrupts in timing diagram 228 are indicated by labels G, H, 1, and J. Of course, the interrupt rate may be varied based on the value stored in the memory (132, FIG. 1A) of the UART interrupt rate reducing system.

Various aspects of the present invention may employ an interrupt rate reducing system used to reduce the rate of interrupts transmitted by a device to a microprocessor. The device may comprise any type of device capable of transmitting interrupts to the microprocessor. The interrupt rate reducing system may comprise any type of circuitry used to reduce the frequency of interrupt generated by the device. Circuitry similar to that used in the embodiment of FIG. 1A may be used. The circuitry may comprise various digital logic devices such as comparators, gates, multiplexers, memories, and counters, for example. One or more appropriate clocking signals or clocks may be acquired from the device.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of reducing the rate of interrupts generated from a universal asynchronous receiver/transmitter (UART), said method comprising:
   receiving a first signal from said UART, said UART generating a first interrupt signal at a first rate;
   using said first signal as an input to a first counter, said first counter outputting a first count;
   comparing said first count to a value;
   generating a second interrupt signal at a second rate when said first count is equal to said value, said second rate being less than said first rate;
   selecting said first interrupt signal or said second interrupt signal using a second signal; and
   generating a third signal used to enable output of said second interrupt signal.

2. The method of claim 1 wherein said first signal is used to measure an elapsed time after one or more conditions are met.

3. The method of claim 1 wherein said first signal comprises a second count generated from a second counter within said UART.

4. The method of claim 3 wherein said first counter is external to said UART, said UART implemented in an integrated circuit chip.

5. The method of claim 3 wherein said first counter and said UART are incorporated within a single integrated circuit chip.

6. The method of claim 3 further comprising generating one or more control signals, wherein said one or more control signals is used to enable or disable said generating said second signal.

7. The method of claim 6 wherein said one or more control signals is used to reset said first and said second counters.

8. The method of claim 1 wherein said value is stored in a memory.

9. The method of claim 1 wherein said comparing is performed using a comparator.

10. The method of claim 1 further comprising generating one or more control signals used to reduce power consumption of said first counter.

11. A system of reducing the rate of interrupts generated from a universal asynchronous receiver/transmitter (UART), said method comprising:
    one or more circuits operable for, at least:
    receiving a first signal from said UART, said UART generating a first interrupt signal at a first rate;
    using said first signal as an input to a first counter, said first counter outputting a first count;
    comparing said first count to a value;
    generating a second interrupt signal at a second rate when said first count is equal to said value, said second rate being less than said first rate;
    selecting said first interrupt signal or said second interrupt signal using a second signal; and
    generating a third signal used to enable output of said second interrupt signal.

12. The system of claim 11 wherein said first signal is used to measure an elapsed time after one or more conditions are met.

13. The system of claim 11 wherein said first signal comprises a second count generated from a second counter within said UART.

14. The system of claim 13 wherein said first counter is external to said UART, said UART implemented in an integrated circuit chip.

15. The system of claim 13 wherein said first counter and said UART are incorporated within a single integrated circuit chip.

16. The system of claim 13 further comprising generating one or more control signals, wherein said one or more control signals is used to enable or disable said generating said second signal.

17. The system of claim 16 wherein said one or more control signals is used to reset said first and said second counters.

18. The system of claim 11 wherein said value is stored in a memory.

19. The system of claim 11 wherein said comparing is performed using a comparator.

20. The system of claim 11 further comprising generating one or more control signals used to reduce power consumption of said first counter.

21. A method of reducing the frequency of one or more interrupts transmitted by a device, said method comprising:
    first receiving one or more first signals from said device that indicate when one or more time out conditions are satisfied;
    second receiving a second signal;
    using said one or more first signals from said device and said second signal as inputs to a counter, said one or more first signal inputs enabling and/or triggering said counter, said second signal used for clocking said counter, said counter outputting a count;
    comparing said count to a value; and generating said one or more interrupts when said count equals said value.

22. The method of claim 21 wherein said second signal is generated from said device.

23. The method of claim 21 wherein said device comprises a universal asynchronous receiver/transmitter (UART).

24. A system for reducing the rate of interrupts transmitted by a universal asynchronous receiver/transmitter to a microprocessor comprising:
- a first counter capable of generating a first count;
- a memory capable of storing a value;
- a comparator used for comparing said first count and said value, said comparator generating a second signal when said first count equals said value; and
- a multiplexer used for selecting a first signal or said second signal, said first signal corresponding to a first interrupt rate, said second signal corresponding to a second interrupt rate, wherein said second interrupt rate is less than said first interrupt rate, said first signal received from said universal asynchronous receiver/transmitter.

25. The system of claim 24 wherein said first counter utilizes a clock pulse generated by said universal asynchronous receiver/transmitter.

26. The system of claim 24 wherein said first counter utilizes a second count generated by a second counter.

27. The system of claim 26 wherein said second counter resides in said universal asynchronous receiver/transmitter.

28. A system for providing a reduced interrupt rate to a microprocessor comprising:
- a logic circuitry for generating a first interrupt at a first rate; and
- a universal asynchronous receiver/transmitter communicatively coupled to said logic circuitry, wherein said logic circuitry receives at least one signal for enabling said logic circuitry to output said first interrupt, said at least one signal generated by said universal asynchronous receiver/transmitter, wherein said universal asynchronous receiver/transmitter outputs a second interrupt at a second rate, and wherein said first rate is less than said second rate.

29. The system of claim 28 wherein said logic circuitry comprises a counter.

30. The system of claim 29 wherein said logic circuitry comprises a multiplexer and a memory, wherein said multiplexer is used for selecting said first interrupt or said second interrupt, and wherein said first rate is based on a value stored in said memory.

* * * * *